June 23, 1959  J. RABINOW  2,892,124
NOISE DISCRIMINATING, HIGH GAIN AUTOMATIC HEADLIGHT DIMMER
Filed Nov. 9, 1955  2 Sheets-Sheet 1

INVENTOR.
Jacob Rabinow
BY
Attorney

June 23, 1959 J. RABINOW 2,892,124
NOISE DISCRIMINATING, HIGH GAIN AUTOMATIC HEADLIGHT DIMMER
Filed Nov. 9, 1955 2 Sheets-Sheet 2

INVENTOR.
Jacob Rabinow
BY
Max L. Libman
Attorney

_United States Patent Office_

2,892,124
Patented June 23, 1959

2,892,124

NOISE DISCRIMINATING, HIGH GAIN AUTOMATIC HEADLIGHT DIMMER

Jacob Rabinow, Takoma Park, Md.

Application November 9, 1955, Serial No. 545,876

6 Claims. (Cl. 315—83)

This invention relates to light modulating means for headlight dimmers whereby a moving shutter modulates the light arriving from a distant source or from a plurality of sources.

In Patent No. 2,632,040, issued to me on March 17, 1953, I pointed out the importance of detecting the relative intensity between the headlight and the background illumination and showed a basic scanning means for detecting headlights. In my patent applications, Serial Nos. 315,897, now Patent No. 2,730,645; 342,508, now Patent No. 2,734,149; 385,942; 409,901, now Patent No. 2,800,-592; and 453,864, now Patent No. 2,827,594, I show other methods of scanning and improvements in this art. In order to reduce the cost of a headlight dimmer it is desirable, at the present time, to use simple photosensing elements followed by high gain amplifiers. One of the objects of this invention is to modulate light arriving from a distant point or a series of points so as to permit the use of a relatively sharply tuned high gain amplifier and also to raise the frequency of the signal passing through the amplifier. It is well known that high gain amplifiers are subject to microphonics and noise. These undesirable effects can be minimized by the use of tuned as compared to wide band amplifiers, and high frequency as compared to low frequency amplifiers.

The specific nature of my invention as well as other objects and advantages thereof will clearly appear from a description of a preferred embodiment as shown in the accompanying drawings, in which.

Figure 11:
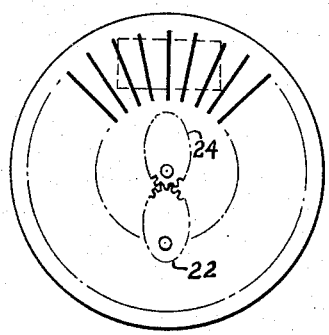
Figure 13:
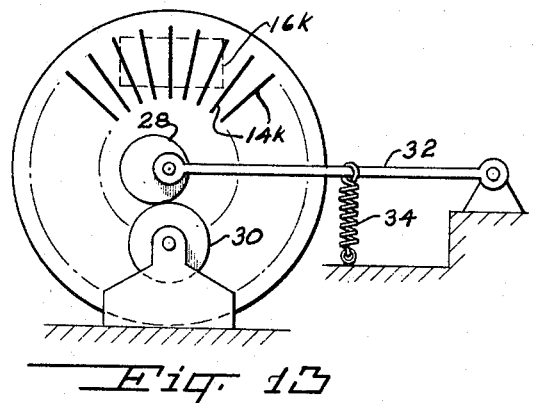
Figure 12:
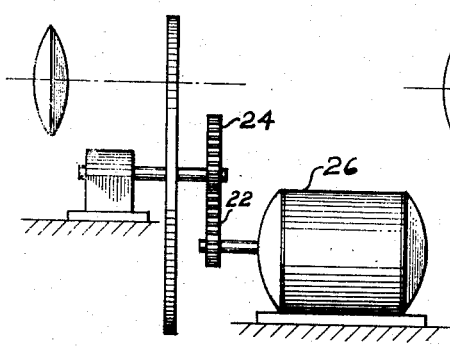

Figs. 6–10 inclusive show shutter bar discs with various configurations of shutter bars, each having some special advantage;

Figs. 11 and 12 show an arrangement for producing a constant frequency output with non-uniform shutter bar spacing; and Figs. 12 and 13 show the principle of an arrangement for producing a constant frequency output with uniform shutter bar spacing by movement of the shutter bar disc relative to the image.

Figure 1:
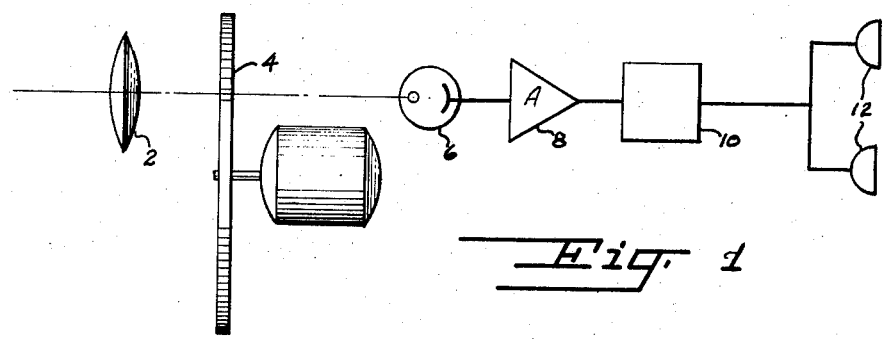
Fig. 1 is a highly simplified schematic diagram showing the relationship of the elements of a typical headlight dimmer according to the invention.

In Fig. 1, I show a typical schematic arrangement of a headlight dimmer employing a lens 2 to produce an image of a desired field of view, said image being focussed on the surface of a revolving disc 4. The disc is provided with suitable apertures, as will be explained below, through which the light from the field of view passes. The light passing through the apertures falls upon the sensitive surface of a photo tube 6 and produces electrical signals which are amplified at 8 and made to actuate a relay 10 that controls the up and down beams of the headlights 12 of the car in which the equipment is installed.

Figure 2:
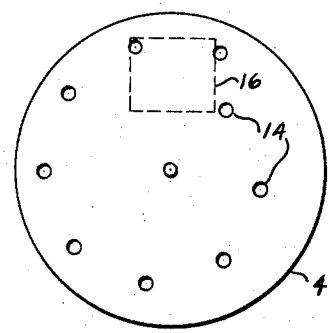
Fig. 2 shows a front view of a standard Nipkow scanning disc illustrating the prior art practice.
Figure 3:
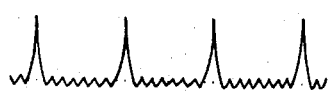
Fig. 3 is a graph showing the wave form of pulses produced with the disc of Fig. 2.
Figure 4A:
Fig. 4a is a graph showing how out of phase signals may be produced by the arrangement of Fig. 4.

Assume first that the scanning disc is of the Nipkow disc type as shown in Fig. 2. This type of disc is provided with a spiral series of small openings 14 which can be round or elongated as described in my Patent No. 2,632,040. As the disc revolves, the image of the field of view shown by dotted line 16 is scanned once each revolution. If the headlights being detected are far away, the headlights are so close together on the scanning disc that with practical size of disc openings they behave as a single source of light and produce a single spike of current per revolution of the disc. The wave form of the signal going into the amplifier is then as shown in Fig. 3. If one assumes a repetition rate of 100 times per second, and the duration of the spike as $1/10,0000$ of a second, it will be obvious that for the amplifier to pass the wave form as shown would require a large band width including frequencies lower than 100 cycles to greater than 10,000 cycles per second. If such an amplifier is required to have a gain of the order of a quarter of a million, as is usually the case, a great deal of noise, due to both thermal effects and microphonics in the first stages, will be experienced.

A narrow band amplifier whose peak frequency is of the order of 10,000 cycles per second may be employed, but such an amplifier will not be efficiently excited by a signal with a repetition rate of only 100 times a second. It is much better to excite such an amplifier with a continuous string of 10,000 cycle pulses, rather than the discrete pulses shown. An obvious method of producing such a string of pulses is to use a light modulating shutter of the type shown in Fig. 4. Such a shutter, while not as desirable from the point of view of discriminating headlights against background illumination as the Nipkow disc, nevertheless also serves to take advantage of the difference between the relative intensity of a headlight and the intensity of the background illumination. However, it raises certain difficulties in its operation when used in a headlight dimmer when the background is not of uniform illumination. If the background illumination is perfectly uniform and if the number of light and dark bars of the disc in the field of view is large, and the bars are so arranged relative to the mask opening 16' that the total light transmittance is constant, then uniform background illumination would not produce any signal in the amplifier. Only bright spots or other small discontinuities in the field of view would produce a signal, and the signal would be a function of the relative intensity of such bright spots and the background brightness. If the background, however, is not uniformly illuminated but consists of the usual objects on or about the road, the disc of Fig. 4 would produce modulation of the background light and produce a signal whose nature depends on the distribution of intensities in the field of view, and the shape and distribution of the light and dark bars on the disc. For example, a vertical telephone pole in the middle of the field of view may produce a large output as it would be scanned by successive light and dark bars of the disc. Methods of overcoming this difficulty will be described below.

Figure 4:
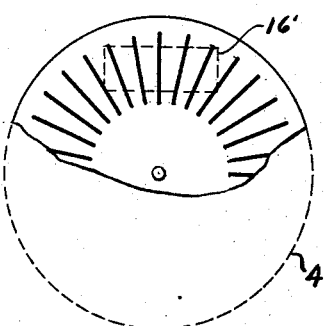
Fig. 4 is a front view of a typical shutter bar disc using equal spacing of shutter bars.
Figure 5:
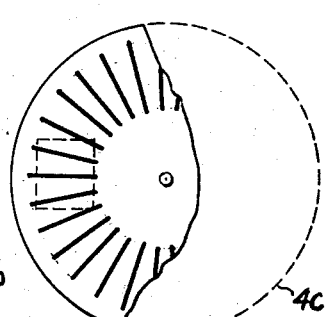
Fig. 5 shows a shutter bar disc using horizontal bars moving vertically across the image.

There is another difficulty with the simple disc shown in Fig. 4. Assume that one is observing a car at a great distance. Assume further that the lights are spaced four feet apart and the car is at a distance of 3,000 feet from the headlight dimmer. If a lens of two inch focal length is used to produce the image, the spacing of the two lights on the disc will be approximately $2/1000$ inch. With an inexpensive single-element lens, such as used in headlight dimmers, the resolution and sharpness of the image does not permit too fine a spacing in the bars of a light modulator or in the size of the openings of a Nipkow disc. A practical dimension for the spacing of the bars is of the order of 1/100 inch. It is obvious, therefore, that the two lights will not be resolved either by the lens or by the disc and will appear at a great distance as one light and produce a single signal as they are scanned by disc 4. As the cars approach each other, however, a point will be reached where the lights are resolved separately and each will produce a separate signal as its image is "chopped" by the bars of the disc 4b. A condition will arise as the cars approach each other where these signals are out of phase and the output of the amplifier will decrease. If the conditions are correct, it may decrease to nearly zero. This will cause the undesirable effect of having the previously dimmed lights come up when the cars are fairly near each other. Mounting the modulating disc so that its dark and light bars are horizontal relative to the image of the field of view would be desirable because then both headlights would be interrupted simultaneously as shown in Fig. 5. With a disc of small dimensions, however, this is not possible for the entire image and this would not solve the problem completely in all cases because two cars may be in the field of view of the dimmer simultaneously. Their headlights may happen to be vertically spaced so as to also produce out-of-phase effects as described above.

Figure 6:
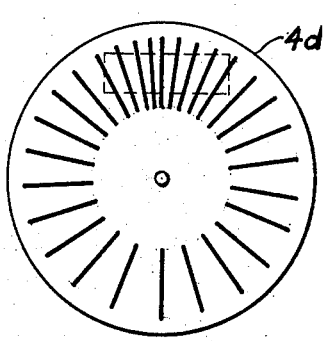

A method of overcoming the difficulties of out-of-phase signals can be achieved by using a non-uniform spacing of bars such as shown in Fig. 6. Here, instead of the light and dark 16d being evenly spaced around the circumference of the disc 4d, their spacing is progressively increased and then decreased so that any spot of light produces an electrical signal of variable frequency. For instance, the bars can be spaced so that a single light spot falling on the disc produces a signal whose frequency varies from 7,000 to 10,000 cycles and back again for each revolution of the disc 4c. Using an amplifier with a reasonably uniform response from 7,000 to 10,000 cycles per second with this type of light modulation avoids the difficulties of out-of-phase signals due to some particular spacing of automobile headlights; the signals may be out of phase for part of a revolution of the disc but no spacing of headlights will cause them to be out of phase during a complete revolution of the disc.

Figure 7:
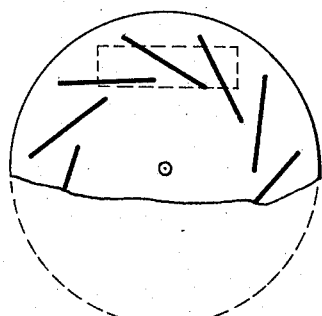
Figure 8:
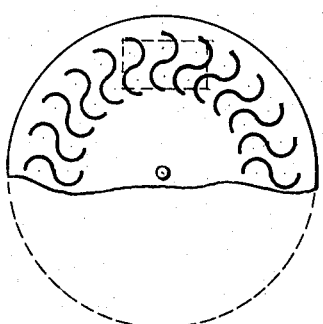

In order to further suppress the signals due to objects dimly illuminated in the background of the field of view, the bars can be tilted relative to the radius as shown in Fig. 7, or they can be made wavy as in Fig. 8. This takes advantage of the fact that most man-made and natural objects have predominant horizontal and vertical lines.

Figure 9:
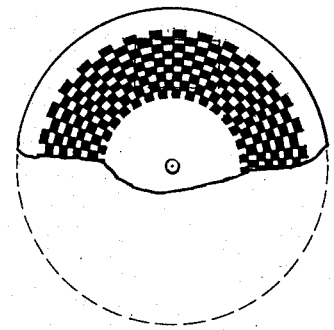
Figure 10:
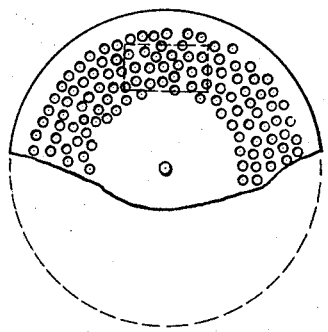

A checkerboard or a multiple hole pattern such as shown in Figs. 9 and 10 can be used to produce a very random voltage due to various objects in the field of view. It will be noted that if the checkerboard or grid pattern is very fine relative to the size of the image of the field of view, and if there are no outstanding or bright small spots in this field of view, this method of scanning produces a wide frequency distribution of noise of low amplitude. The finer the pattern, that is the more elements the pattern, that is the more elements are viewed simultaneously, the lower is the noise produced by such scanning and the wider is its frequency spectrum.

The non-uniform spacing of the light modulating bars, as stated above, does necessarily require an amplifier with a fairly broad band. In order to decrease the noise of the amplifier as far as possible, it would be desirable to have the amplifier sharply tuned. Fig. 11 shows a method of using a non-uniform spacing of the bars of the modulating disc which still produces a constant frequency output from the light. This is done by driving the disc at a non-uniform rate. The disc is driven so that when the bars are close together, the disc rotates slowly, and as the bars spread apart, the disc speed increases. One method of achieving this is to use non-circular gears to drive such a disc. As is well known, gears whose speed ratio is not uniform can be cut. I show two elliptical gears 22 and 24 in Figs. 11 and 12. Gear 22 is driven by a constant speed motor 26 and the second drives the disc. If the disc bars are properly laid out so that the spacing of the bars is proportional to the disc speed at all times, a modulation of substantially constant frequency is obtained, together with the advantage of non-uniform spacing.

Figure 14:
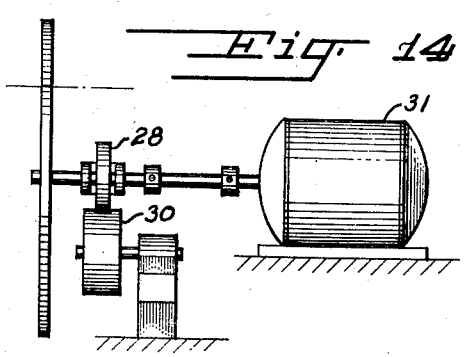

Another method of producing non-uniform bar spacing with a constant frequency output is shown in Figs. 13 and 14. Here the spacing of the bars 14k is uniform around the periphery, but the disc 4k is made to move up and down relative to the mask opening 16k so that the distance between the bars increases as the center of rotation drops and increases as the center of the disc is raised. There are many possible methods of moving the disc up and down as it revolves, but for the sake of illustration I show one which employs a cam 28 mounted on the shaft of the disc 4k. This cam rests against the roller 30 mounted rigidly to the frame, and the shaft of the disc is constrained to move in a substantially vertical direction by the arm 32 pivoted to the frame. The motor 31 is coupled to the disc drive shaft either through a flexible shaft or by a rigid shaft 32 employing two universal joints. The disc cam is made to press against the coupling roller by spring 34. It will be seen that as the disc revolves it will move up and down once during every revolution. The spacing of the bars in front of the mask opening, therefore, will change, but the frequency of modulation will remain constant since the angular velocity of the disc is constant.

Other methods of producing similar results are, of course, possible. One can, for example, move the mask opening up and down at the same time moving the image by a mirror, instead of moving the revolving disc.

It will thus be seen that I have shown here a method of modulating small points of light so as to distinguish them from the background illumination and modulating them in such a manner that I produce a constant frequency signal independently of the spacing of such lights or their position on the image.

I do not wish to limit myself to any particular type or method of manufacture of discs suitable to my devices. Drums as well as discs may be employed and they can, for example, be produced photographically or by the various etching techniques known for producing fine perforations in sheet metal.

It will be apparent that the embodiments shown are only exemplary and that various modifications can be made in construction and arrangement within the scope of my invention as defined in the appended claims.

I claim:

1. An automatic headlight dimmer comprising means for simultaneously examining a plurality of individual small elemental areas of a selected portion of a driver's field of view, means responsive to light emitted by said elemental areas to produce electrical signals which are a function of the intensities of light coming from said elemental areas, means to prevent the cancellation of the electrical signal produced by a source of light located in one of said elemental areas by the electrical signal produced by light source in another of said elemental areas, said last means comprising means for focussing the light from said field of view, a rotatable light modulating shutter interposed between said field of view and said light responsive means in substantially the focal plane of said focussing means, said shutter having a plurality of small areas having different light transmittance values, said areas being arranged to produce a periodic interruption of light from said field of view to produce thereby a periodic signal output from said light responsive means corresponding to the spacing of said areas and the rotational speed of said shutter, said areas being assymmetrically arranged to minimize the possibility of oppositely-phased periodic signals from different areas of said field of view cancelling each other, electrical circuit means for producing a signal output related to the intensity of light emitted by the said elemental areas, and a headlight dimmer controlled by the output of said electrical circuit means.

2. An automatic headlight dimmer comprising means for producing an image of a field of view ahead of a vehicle, light shutter means having a fine pattern of opaque and transparent areas periodically movable relative to and in the plane of said image to modulate the light from said field of view, photoelectric means responsive to said modulated light to produce a periodically varying electric signal in response to differences in intensity of illumination of adjacent portions of said field of view but not in response to a uniform intensity of said illumination over said field, a tuned amplifier responsive to said periodically varying electric signals, and headlight dimming means responsive to the output of said amplifier, and means for moving said light shutter means non-uniformly with respect to said image so that the periodic interruptions of light from different portions of said image occur at different frequencies over a predetermined band of frequencies.

3. The invention according to claim 2, and further means for converting said different light interruption frequencies to a uniform electric signal frequency.

4. The invention according to claim 3, said last means comprising means for spacing the opaque and transparent areas progressively in a non-uniform manner, and means for moving said light shutter means in the image plane in a compensating non-uniform manner whereby a constant frequency electric signal output is produced.

5. An automatic headlight dimmer comprising means for producing an image of a field of view ahead of a vehicle, light shutter means having a fine pattern of opaque and transparent areas periodically movable relative to and in the plane of said image to modulate the light from said field of view, photoelectric means responsive to said modulated light to produce a periodically varying electric signal in response to differences in intensity of illumination of adjacent portions of said field of view but not in response to a uniform intensity of said illumination over said field, a tuned amplifier responsive to said periodically varying electric signals, and headlight dimming means responsive to the output of said amplifier, said pattern being a checkerboard pattern.

6. An automatic headlight dimmer comprising means for producing an image of a field of view ahead of a vehicle, light shutter means having a fine pattern of opaque and transparent areas periodically movable relative to and in the plane of said image to modulate the light from said field of view, photoelectric means responsive to said modulated light to produce a periodically varying electric signal in responsive to differences in intensity of illumination of adjacent portions of said field of view but not in response to a uniform intensity of said illumination over said field, a tuned amplifier responsive to said periodically varying electric signals, and headlight dimming means responsive to the output of said amplifier, said pattern being a wavy line pattern.

References Cited in the file of this patent
UNITED STATES PATENTS

| | | |
|---|---|---|
| 2,524,531 | Lange | Oct. 3, 1950 |
| 2,524,807 | Kallmann | Oct. 10, 1950 |
| 2,565,745 | Skalka | Aug. 28, 1951 |
| 2,604,528 | Obermaier | July 22, 1952 |
| 2,632,040 | Rabinow | Mar. 17, 1953 |
| 2,636,602 | Stoate et al. | Apr. 28, 1953 |
| 2,710,559 | Heitmiller et al. | June 14, 1955 |
| 2,730,654 | Rabinow | Jan. 10, 1956 |
| 2,743,390 | Renfro | Apr. 24, 1956 |